[19] United States Patent
Turner

[11] 3,956,128
[45] May 11, 1976

[54] APPARATUS FOR TREATING INDUSTRIAL AND DOMESTIC WASTE WATERS

[75] Inventor: Abner B. Turner, Greensburg, Pa.

[73] Assignee: Degremont, S.A., Rueil-Malmaison, France

[22] Filed: Mar. 12, 1975

[21] Appl. No.: 557,888

Related U.S. Application Data

[60] Continuation of Ser. No. 379,676, July 16, 1973, abandoned, which is a division of Ser. No. 281,076, Aug. 16, 1972, Pat. No. 3,774,768.

[52] U.S. Cl. ............................. 210/150; 210/175; 210/196; 210/221 P; 210/274; 210/290
[51] Int. Cl.[2] .................... C02C 1/04; B01D 23/10
[58] Field of Search ............... 210/8, 17, 42, 44, 71, 210/150, 151, 169, 195, 196, 199, 221, 274, 283, 290, 152, 175, 205, 209; 261/3, 5, 6, 94, 95, 98

[56] References Cited
UNITED STATES PATENTS

| 2,834,466 | 5/1958 | Hament | 261/95 X |
|---|---|---|---|
| 3,232,589 | 2/1966 | Eckert | 261/95 |
| 3,477,581 | 11/1969 | Stearns | 210/195 |
| 3,494,463 | 2/1970 | Vermette | 210/151 X |
| 3,544,457 | 12/1970 | Tulley et al. | 210/290 X |
| 3,616,919 | 11/1971 | Feddern et al. | 210/169 |
| 3,622,508 | 11/1971 | Komline | 210/44 X |
| 3,642,617 | 2/1972 | Brink et al. | 210/221 X |
| 3,709,364 | 1/1973 | Savage | 210/196 X |
| 3,720,319 | 3/1973 | White | 210/169 |
| 3,732,160 | 5/1973 | Klock | 210/150 X |

FOREIGN PATENTS OR APPLICATIONS

| 2,049,072 | 4/1971 | Germany | 210/150 |
|---|---|---|---|

Primary Examiner—Charles N. Hart
Assistant Examiner—Robert H. Spitzer
Attorney, Agent, or Firm—Wenderoth, Lind & Ponack

[57] ABSTRACT

A system for treating waste waters including a pair of concentric tanks forming a space therebetween which serves as an aeration chamber. Untreated but screened waste water is discharged into the (annular) space and withdrawn therefrom by a pump which passes the liquid through an oxygenating device which induces air into the liquid. The liquid is then circulated through long tubing wound around the outside peripheral surface of the tank to obtain intimate contact between the gas, liquid and solids therein and to convert dissolved material into insoluble material by a conventional biochemical process. The liquid thus processed in the tubing is introduced into the central or inner tank where the treated solids rise to the surface for recycling in the system while the liquid effluent is filtered and discharged to a river or stream.

4 Claims, 5 Drawing Figures

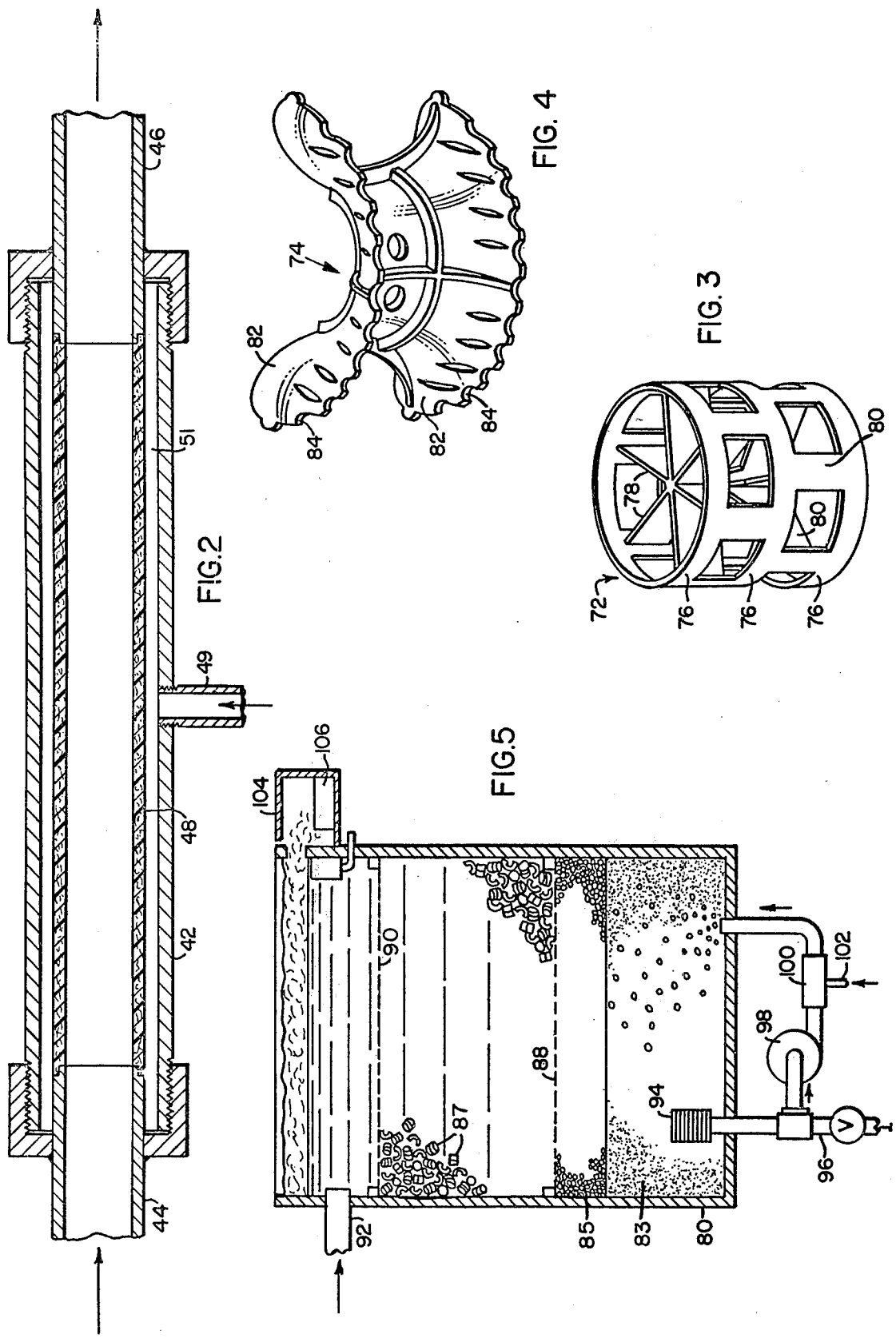

APPARATUS FOR TREATING INDUSTRIAL AND DOMESTIC WASTE WATERS

This is a Continuation, of application Ser. No. 379,676, filed July 16, 1973, now abandoned, which is a division of application Ser. No. 281,076, filed Aug. 16, 1972, now U.S. Pat. No. 3,774,768.

BACKGROUND OF THE INVENTION

The invention described herein relates to waste water treatment systems and more particularly to a system for treating waste waters by contact-stabilization techniques.

Conventional commercial sewage disposal plants contain multiple tanks, associated air systems and sludge disposal means for treating domestic and industrial waste materials. Since waste water treatment systems of this type are expensive to install and maintain and because considerable time is required to properly process the waste waters, consideration has been given in the past to utilizing a contact stabilization system to remove BOD from sewage in a fraction of the time required by the conventional commercial systems. Published information on contact-stabilization systems disclose the use of a baffled aeration tank which serves the function of two tanks and a final clarifier tank, for removing sewage BOD by physical adsorption in 20–30 minutes. The aeration tank serves both contact and stabilization functions by initially aerating the raw influent in the contact aeration portion of the tank and after passing through the clarifier, the other part of the tank which is in open communication with the contact portion, stabilizes the remaining BOD.

The disadvantages inherent in the above described contact-stabilization system is that when tank like structures are used, air discharged into the tank from a diffuser, rises uniformly to the liquid surface in the form of relatively large size bubbles and the desired degree of contact is not made with the suspended solids. As a result, optimum contact of the solids per unit volume of air is not achieved and the air or oxygen system is therefore relatively inefficient. Because of this, the tank must therefore be sized to a large volume. Usually the solids must be removed physically from the system by a bottom rake or similar structure.

Moreover, since the same tank is used for both contact and stabilization purposes, intermixing of untreated and treated liquids occur and the process is therefore not as efficient as when separate tanks are used to secure performance of the separate functions.

SUMMARY OF THE INVENTION

Briefly stated, this invention eliminates the above-described prior art disadvantages by providing a system or removing BOD from waste waters by utilizing a single containment structure which incorporates a surge aeration tank and an efficient system for transferring oxygen to a liquid which is circulated through a contact section to secure intimate contact of the oxygen containing gas-suspended solids-liquid mixture. The same single structure includes a solids removal section which separates solids from an effluent sufficiently pure for discharge to a river or stream, and a section in which the suspended solids are aerobically digested. It will occur to those skilled in the art that the structure maximizes the oxygen utilization within the system while simultaneously generating small air bubbles for achieving great efficiency and consequent rapid removal of BOD from the influent.

An object of the invention therefore is to provide a system which maximizes the transfer of oxygen to waste waters being treated and which produces small bubbles for maximum contact with the suspended solids.

Another object of the invention is to provide a contact stabilization system for treating waste waters by introducing oxygen into the system under hyperbaric pressure for aerobically digesting the solids, and filtering the effluent.

Another object of the invention is to provide a single contact vessel for removing BOD from waste waters and which relys on contact stabilization techniques.

DESCRIPTION OF THE DRAWING

The subject matter which is considered to comprise the invention is particularly pointed out and distinctly claimed in the concluding portion of this specification. The invention however both as to organization and method of operation, together with further objects and advantages thereof, may best be understood by reference to the following description taken in connection with the accompanying drawing, wherein:

FIG. 2 is a sectional view of an oxygenator used for supplying oxygen to the system;

FIG. 3 is an isometric view of one type of plastic element used in an aerated packed column in the system;

FIG. 4 is an isometric view of another type of plastic element; and

FIG. 5 is a modified form of the invention.

DESCRIPTION OF THE PREFERRED EMBODIMENT

Figure 1:
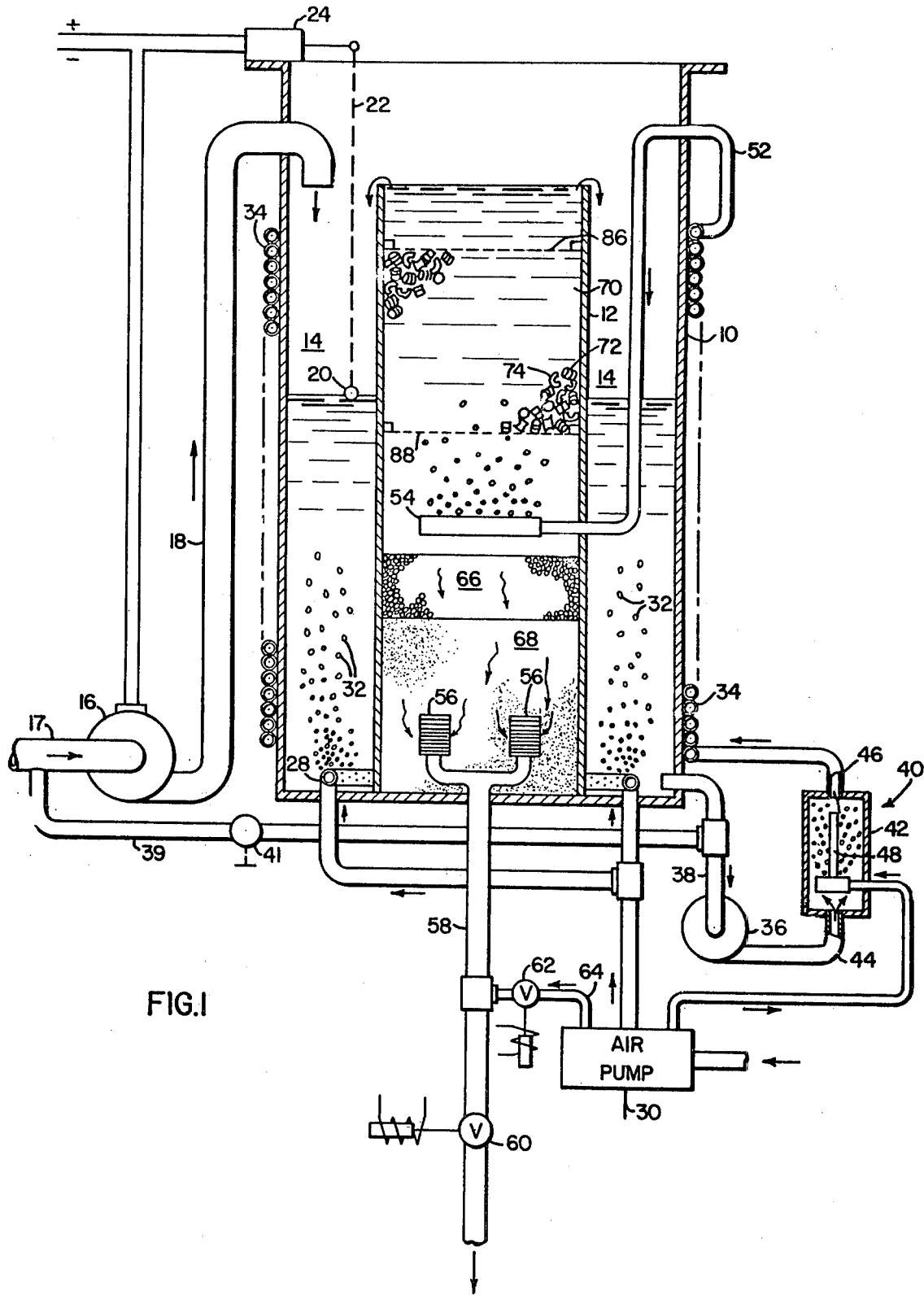
FIG. 1 is view in elevation partly in section illustrating apparatus for carrying out the process of this invention.

Referring now to the drawings wherein like reference characters designate like or corresponding parts, there is shown a containment vessel 10 made of reinforced glass, coated steel or other material which is non-corrosive and non-reacting with microorganisms prevalent in a waste water treatment system. A second vessel 12 is located within vessel 10 to provide an annular space therebetween which serves as a surge aeration and aerobic digestion tank 14. Pump 16 connected to a screened sewage source (not shown) pumps screened sewage through pipe 17 and outlet 18 into the surge aeration tank. The level of liquid in tank 14 is held constant by a conventional liquid level sensor device, here shown as a float 20 having an arm 22 mechanically connected to a switch 24 which starts and stops the pump motor as the liquid level falls and rises in tank 14. Porous tubing 28 shaped to the configuration of a ring and located in the bottom of tank 14, supplies air from source 30 to the screened sewage in the tank at a rate of about 5 SCFH. The tubing is especially selected to supply small air bubbles 32 having a high surface area per unit volume of air, as distinguished from a pipe having air perforations therein. The air functions to provide energy to microorganisms in the tank and since the small bubbles 32 rise slowly, the relatively long retention time in the liquid helps assure high oxygen transfer and stabilization and aerobic digestion of the solid suspended particles.

The objective of a contact stabilization process is to remove oxygen-consuming organic matter from waste waters in a fraction of the time required in conventional commercial plants. This is accomplished by the present invention by circulating the liquid from tank 14 through tubing 34 wrapped around the outer peripheral surface of vessel 10. A pump 36 having its inlet 38 connected to the bottom of tank 14, or directly to pipe 17 through pipe 39 having shut-off valve 41 therein, discharges the liquid into a bubble generator 40 of the type illustrated in FIG. 2.

As shown, the generator comprises a cylindrical housing 42 having a liquid inlet 44 and outlet 46. Porous tubing 48 mounted inside the housing is connected between the inlet 44 and outlet 46 to thereby permit flow of the liquid-suspended solids mixture therethrough. An air or gas inlet 49 extending from air source 30 introduces air into the space 51. The tubing characteristics are chosen such that air can seep through the tubing walls when supplied at a pressure in excess of the liquid pressure and at a rate of 0.5 SCFH. As air filters through the tubing walls, minute bubbles are formed on the tubing surface which are scoured off by the liquid as it flows through the bubble generator and the air therefore becomes intimately mixed with the turbulent liquid. The amount of air or oxygen in the form of bubbles furnished depends on the type and characteristics of solid being treated and the type of products formed in the process.

To carry out the biochemical oxidation process which converts soluble solids to insoluble solids, the iquid-oxygen mixture is discharged from the oxygen generator at a rate of about 3 g.p.m. into a long tubular coil 34 wound around the outer peripheral surface of vessel 10. The tubing of the coil chosen to illustrate the invention is 500 feet long and has a ¾ inch diameter. It comprises a non-corrosive material such as polyvinyl chloride which is non-inhibiting to microorganisms therein. During its passage through the coil, the liquid is in a highly turbulent state thus providing great opportunity for the oxygen to be diffused throughout the liquid and thus engender action by the microorganisms in absorbing food represented by the dissolved and suspended solids. The confinement of liquid to the small cross-sectional area of the coil and concentration of oxygen and microorganisms to the relatively small space facilitates the biochemical oxidation process and assists in converting the soluble solids to insoluble solids during the liquid detention time of about 12–15 minutes in the coil.

To separate solids from liquid discharged from the coil, a pipe 52 connects the coil outlet with a diffuser 54 mounted about the middle of vessel 10. The solids are in the form of biological floc incorporating small air bubbles which rise to the surface where they can be skimmed off, or alternatively, flow over into tank 14 for recirculation in the system. A very slight amount of heavy solids settle to the bottom. The liquid portion is discharged as effluent through filters 66 and 68 and strainers 56 positioned in the bottom of vessel 12 and through pipe 58 to a river or stream. These strainers 56 are slotted stainless steel cylinders having slot openings of 0.050 inches, or they may simply comprise a pipe with perforations in the pipe walls enclosed in a wire mesh screen.

At the time of discharge of liquid through the strainers, about 90 percent of the solids have been removed by the bacterial action in tank 14 and coil 34 and the liquid usually contains about 5–10 parts per million of suspended solids. The degree of liquid purity achieved by this process is well within governmental requirements that the liquid BOD or solids be reduced by 85 percent before discharge to a river or stream. To achieve an even greater degree of purity, the liquid may be chlorinated according to conventional practices prior to discharge from the system.

Since it is desirable to make provision for back washing of strainers 56 and filters 66 and 68, a pair of solenoid operated valves 60 and 62 are respectively located in the effluent discharge line 58 and air line 64 which extends from the air source. It will be apparent to those skilled in the art that the solenoids for valves 60 and 62 are energized simultaneously to shut off liquid flow through line 58 and establish communication between the air source and strainer. After a predetermined time, when the filters have been cleared, the valves are reversed for normal operation of the system.

The filter shown in the bottom of vessel 12 comprises a body of sand 68 and an overlayer of carbon 66, such as granulated coal which effectively serve as a filter for the liquid as it moves downwardly to strainers 56 prior to being discharged into the effluent line 58. Either sand or activated carbon may alone be used.

The effectiveness of the above described system is indicated from the following representative data taken from long term operation on a 700 gal/day system.

|  | SUSPENDED SOLIDS mg/l | COD mg/l |
| --- | --- | --- |
| FEED | 366 | 663 |
| EFFLUENT | 29 | 61 |
| % REDUCTION | 92 | 91 |

In operation, screened influent from pipe 17 is supplied by pump 16 to tank 14 or bypassed directly to the inlet of pump 36. In either event, the influent is delivered to oxygenator 40 where oxygen in the form of air is diffused from tube 48 into the liquid for supporting the biochemical oxidation process which takes place in the long length of tubing 34 wound on the outer surface of vessel 10. As the treated liquid is discharged through manifold 54 into vessel 10, the floc and unadsorbed bubbles rise to the surface and spills over into tank 14 for recycling in the system, such recycling constituting an aeration of the aerobic digestion section of the system. Liquid from the manifold is filtered by the carbon 66 and/or sand 68 and then discharged through outlet 58 to a river or stream as a substantially clear effluent which meets governmental requirements for purity. Air pump 30 supplies air to the system for supporting the process and for back washing purposes when needed.

To enhance purification even further without increasing the volume of the system, an aerated packed column, herein shown as packing 70, may be positioned in the upper portion of tank 12. The purpose of an aerated packed column is to maintain a large population of aerobic bacteria in a small volume without having to deal with the problems of sludge recycle and close critical control of system parameters found in prior art installations. The bacteria must receive nutrients and oxygen usually in the form of air, the solids must be removed and flow through the system should be laminar enough not to dislodge the bacteria from the support but still sufficiently turbulent to establish and maintain a thoroughly mixed liquid.

Early U.S. Pat. Nos. 2,389,357 - Griffith and 2,458,163 - Hayes disclose a contact aeration process consisting of a number of cement - asbestos board plates suspended in an aeration tank. Air introduced beneath the plates bubbles upwardly into contact with the plate surfaces. Bacteria use the plates as a support media on which to grow and ingest the contaminates from presettled sewage as it flows past the plates. Subsequent advances in the art show that the potential process contained disadvantages, namely that the population density of the bacteria was limited by the surface area of the flat or corrugated plates, the amount of oxygen transferred by the air bubbles was limited and difficulties were encountered in removal of solids.

These disadvantages can be overcome by constructing the column 70 with polypropylene packing of the design shown in FIGS. 3 and 4 and aerating the column with dissolved air bubbles which are contained in the mixture from manifold 54. The packing may consist of tubular elements 72 of polypropylene, or other material, illustrated in FIG. 3 or semi-circular elements 74 as shown in FIG. 4. The element of FIG. 3 is manufactured by the Koch Engineering Co. and sold under the trademark FLEXARING which the element of FIG. 4 is manufactured by U.S. Stoneware Corp. and sold under the trademark INTALOX.

The FIG. 3 element generally consists of three spaced rings 76 bonded to the outer edges of a number of ribbed plates 78 and 80. The element 74 of FIG. 4 is somewhat semi-circular having sides 82 which flare outwardly and have serrations 84 on their outer edges.

The elements are randomly located between upper and lower screens 86 and 88 mounted in the upper portion of vessel 12. When randomly positioned therein, the element 72 will have an exposed surface area of 107 ft.$^2$/ft.$^3$ while the element 74 will have a surface area of 67 ft.$^2$/ft.$^3$. Since the tubular element 72 may clog with bacteria under some conditions of operation the random disposition of elements desirably should provide about 50 ft.$^2$/ft.$^3$ and this can be accomplished by reducing the number of elements to provide rings 76 with about a 2 inch diameter rather than 1 inch diameter.

As the gas-liquid-solids mixture flows out of manifold 54 during system operation, the mixture will be substantially free of solid matter and the effluent will meet government standards for purity as indicated above. However some dissolved solids will still be present in the mixture. Because bacteria will grow on the packing and oxygen in the form of small air bubbles will come out of solution, solids remaining in the mixture will be consumed and the resulting flow will rise to the surface and spill over into space 14 for recirculation in the system.

The aerated packed column and filter in tank 12 may also be operated to provide contact aeration in a slightly different manner. As shown in FIG. 5, tank 80 contains a filter comprising sand 83 perferably with an overlayer of carbon such as granulated coal 85. An aerated packed column surmounts the filter and consists of randomly disposed polypropylene elements 87 of the type shown in FIGS. 3 and 4 which are stored between a pair of spaced screens 88 and 90 mounted on the tank walls. Screened sewage influent is introduced through inlet 92 and effluent is discharged from the tank through a strainer 94 and outlet pipe 96. To provide air to the system, a part of the effluent is recirculated by pump 98 to an oxygenator 100 of the design shown in FIG. 2, which diffuses air into the effluent from air inlet 102. The air dissolves in the recirculated liquid effluent and very small bubbles of about 0.01 cm. diameter come out of solution and slowly rise through the filter and aerated packed column. Since the volume of air introduced to the tank produces small bubbles, the total of which have a large surface area, maximum oxygen transfer to the bacteria in the packing area is accomplished. This large bacteria supporting area provided by the packing, coupled with sufficient air for their metabolism allows a very high population to be maintained in a small volume.

As the screened sewage flows downwardly through the tank, the suspended solids are removed by the microorganisms on the packing and as they become inactive, the rising tide of small air bubbles removes the dead cells from the packing surface. As they are sloughed off, the dead cell bodies float to the surface of the liquid and are either skimmed off or otherwise discharged into container 104 and incinerator 106 for decomposition by burning.

In view of the above it will be apparent that many variations and modifications are possible in light of the above teachings. It therefore is to be understood that within the scope of the appended claims, the invention may be practiced other than as specifically described.

What is claimed is:

1. A system for treating industrial and domestic waste sewage, said system comprising:
   a tank;
   a filter positioned in said tank;
   an aerated packed column mounted above said filter in said tank, said column including a bacteria support media having a surface area of approximately 50 ft.$^2$/ft.$^3$;
   inlet means for introducing into said tank screened sewage having suspended solids therein and for passing said sewage downwardly through said column and said filter;
   effluent outlet means at the bottom of said tank for removing effluent from said tank;
   by-pass passage means, including a pump, extending from said effluent outlet means to a lower portion of said tank for recirculating a portion of said effluent back into said tank;
   means connected to said by-pass passage means for diffusing air into the recirculated effluent portion, for causing the air upon entry into said tank to separate in the form of small air bubbles from said recirculated effluent, and for forcing said air bubbles upwardly through said support media to provide oxygen to microorganisms growing on said support media which biologically remove the BOD loading in said sewage; and
   means positioned on said tank for receiving and burning floc which rises to the surface of said tank from said support media.

2. A system as claimed in claim 1, wherein said support media comprises a multiplicity of tubular elements having exposed flat sections therein forming means to provide a surface area for the growth of bacteria.

3. A system as claimed in claim 1, wherein said support media comprises a multiplicity of semi-circular elements having flared sides with serrations in the side edges.

4. A system as claimed in claim 1, wherein the means for diffusing air into said recirculated effluent comprises a housing having a porous tube therein; said tube being connected to said by-pass passage means; a space between said tube and said housing; and air inlet means extending into said space for supplying air thereto and for diffusing said air through the walls of said tube into said recirculated effluent.

* * * * *